United States Patent Office 3,201,317
Patented Aug. 17, 1965

3,201,317
ANTIFOAM BARIUM SULFATE SUSPENSIONS
Roscoe E. Miller, R.R. 17, Box 503, Indianapolis, Ind.
No Drawing. Filed June 12, 1963, Ser. No. 287,177
6 Claims. (Cl. 167—95)

This invention relates to novel barium sulfate suspensions for use in X-ray photography or fluoroscopy of the esophagus, the stomach or the intestinal tract.

Barium sulfate, in the form of an aqueous suspension, has long been used by roentgenologists as a radio-opaque material for better visualization of the esophagus, stomach, small bowel and colon during fluoroscopic or X-ray examination of these organs. Barium sulfate is a dense substance, however, and even when finely ground, settles with great rapidity from an ordinary aqueous suspension. Because of this fact, a variety of suspending agents have been suggested for use in preparing stable barium sulfate suspensions. Among such agents have been colloidal clays, pectin, carboxymethyl cellulose, carboxymethyl dextran, and gum tragacanth. Although the barium sulfate suspensions prepared with these agents had a greatly decreased settling time compared with ordinary barium sulfate, they were far from satisfactory in many ways. For example, many commercially available barium sulfate suspensions form lumps in the intestinal canal or dry out and cause "cracking" or "flaking," thus giving either a non-uniform coating on the intestinal wall or obscuring the actual lesions by lumps, flakes, etc. produced thereby. In addition, many barium sulfate suspensions tend to flocculate in the presence of mucin, a substance present in the stomach and colon, and therefore give unsatisfactory results when used in visualizing the stomach, small bowel, or the colon by X-ray.

It is an object of this invention to provide a novel suspending medium for barium sulfate which will overcome the disadvantages of the prior art suspending mediums. It is also an object of this invention to provide a novel barium sulfate suspension which will be stable, palatable, compatible with stomach fluids and which will provide a smooth, even, long-lasting coating on the lining of the stomach, small bowel and colon. Other objects of this invention will become apparent from the description which follows.

In fulfillment of the above and other objects, this invention provides novel powders for use in preparing radio-opaque suspensions useful in roentgenography of the esophagus and intestinal tract containing barium sulfate, magnesium montmorillonite, magnesium trisilicate, sodium carboxymethyl cellulose and an antifoam agent such as an ethyl polysilicate. These ingredients are thoroughly mixed before use, and in addition, each ingredient must be present in a finely divided state, preferably of colloidal dimensions, for the ultimate in stability of the final suspension. The ingredients may be finely ground or pulverized prior to mixing or the final mixture can be ground to the desired size. The final powder is then mixed with water for use as a radio-opaque suspension, the amount of water depending on the particular section of the intestine which is to be visualized. The provision of these suspensions forms a second aspect of this invention. Other ingredients such as sweetening agent, odorants and the like can also be present to make the novel aqueous suspensions more palatible. Additionally, preservatives can be present if it is desired to keep the suspension any length of time or if it is desired to market the suspension in ready-to-use form instead of as a powder. Any of the above ingredients can be added either to the powders of this invention or to the suspensions prepared therefrom.

The following are the operative ranges of the ingredients which are used to prepare radio-opaque powders coming within the scope of this invention.

| Ingredient | Range | Preferred Percentage |
|---|---|---|
| | Percent | Percent |
| Barium sulfate | 90–96 | 93 |
| Magnesium montmorillonite | 1–2 | 1.6 |
| Magnesium trisilicate | .2–1 | .39 |
| Methyl polysilicon | .05–.18 | .123 |
| Methyl p-hydroxy benzoate (methyl paraben) | 0–.25 | .0375 |
| Propyl p-hydroxy benzoate (propyl paraben) | 0–.12 | .0185 |
| Methyl salicylate | 0–.05 | .025 |
| Sucaryl powder | 0–.05 | .0283 |
| Saccharin sodium | 0–.05 | .0187 |
| Sodium carboxymethyl cellulose as a 2% solution (viscosity 25–50 centipoises at 25° C.) | 2–8 | 4.758 |

Low viscosity sodium carboxymethyl cellulose can also be added in the form of a dry powder to the extent of 3.3–7.0% by weight.

Other preservatives can be employed in place of the alkyl p-hydroxy benzoates specified above. The percent employed will depend, of course, on their relative bacteriostatic activity.

A typical powder coming within the scope of this invention is prepared as follows: 10 kg. of barium sulfate U.S.P., 720 g. of highly purified magnesium montmorillonite, 300 g. of magnesium trisilicate, 30 g. of methyl paraben, 15 g. of propyl paraben, 22.5 g. of Sucaryl, 15 g. of saccharin and 2400 g. of a 2% aqueous solution of a low viscosity sodium carboxymethyl cellulose (20–50 centipoises at 25° C.) are placed in a Hobart blender and thoroughly mixed. 7.5 cc. of methyl salicylate and 48 g. of ethyl poly salicylate are slowly blended into the mixture, which is then transferred to a larger blender. 38 kg. of barium sulfate U.S.P. are then added and the powder is again thoroughly mixed. The resulting powder is then passed through a hammermill three or four times in order to attain a powder of satisfactory dimensions.

One part of a radio-opaque powder prepared according to the above procedure can be diluted with equal volumes of water to provide a barium swallow for aid in determining by fluoroscopy whether there are any abnormalities in the esophagus or stomach. A dilution containing 20–25 grams of the above powder per 100 ml. of final aqueous suspension is employed for a regular "penetration technique" barium enema for use with 125 kv. X-rays in detecting abnormalities of the lower bowel. Lower concentrations can be used with lower voltage X-rays while still achieving desirable penetration. Barium enemas for use in air contrast studies of the lower bowel are prepared by diluting 40–50 grams of the above powder to 100 ml. with water. The same suspension can be employed in ordinary stomach and small bowel X-ray examinations. Finally, a suspension containing 60 grams of the above powder diluted with water to 100 ml. is used with heavy contrast techniques.

Suspensions coming within the scope of this invention and prepared from the powder of this invention have a number of desirable properties. In the first place, the suspensions are thoroughly compatible with tannic acid, 4,4'-(diacetoxydiphenyl)-(pyridyl-2)-methane, 3,3-bis (4-hydroxy phenyl) oxindole and other materials commonly used is post-evacuation films. Secondly, the barium sulfate suspensions of this invention empty rapidly from the stomach into the small bowel, making possible the taking of stomach films without delay, a definite advantage in both upper gastro-intestinal studies, and small bowel X-ray studies. Thirdly, the dispersion of the barium sulfate is of such excellent quality that it stays suspended for long periods of time without clumping or sedimentation. Thus, there is little tendency for the suspensions to clog enema tips, connectors and tubing. Fourthly, these novel suspensions are readily miscible with body fluids and resist flocculation with gastric mucin a pH's between 2 and 8.5, pH's of the stomach and colon respectively. In the fifth place, the suspensions have excellent adhesiveness for the upper gastro-intestinal mucosa where they deposit a thin smooth film which lasts for periods as long as 10–15 minutes, without forming lumps in the gastro-intestinal canal, or without drying out and producing "cracking" or "flaking" (breaking up) of the film. This latter condition produces artifacts in the X-ray film which are difficult to distinguish from bowel or stomach pathology, and their absence is most advantageous. Lastly, my novel barium sulfate suspensions do not foam, a very desirable property since bubbles or foam produce fictitious roentographic signs. All of the above qualities make the X-ray photographs obtained by the use of the suspensions of this invention more satisfactory than those obtained with the barium sulfate suspension of the prior art. In addition, the stability of my novel barium sulfate suspensions with regard to flaking, cracking or drying out in both the upper and lower bowel make possible the carrying out of two different examinations on the same day; for example, an air contrast study of the colon and a full column or filled suspension study. Furthermore, the fact that a uniform coating is present on the lower bowel (colon) wall for periods of 1 to 2 hours and even 4 hours makes possible re-examination of questionable lesions the same day as the original examination was made. Presently available barium sulfate suspensions give a satisfactory coating in the colon for less than one-half hour and most for less than 10 minutes.

The above suspensions are also nontoxic for humans, producing neither diarrhea or constipation.

The superiority of my novel barium sulfate suspensions can be demonstrated in various ways. For example, barium sulfate suspensions can be prepared by diluting equal weights of a powder prepared according to the procedure outlined above and of prior art processes with graduated amounts of water. The resulting mixtures are then shaken and placed in standard 100 cm. tubes. The amount of barium in suspension is then determined by passing a 90 kv. source of X-radiation through the suspension and recording the percent of radiation transmitted at various levels of the suspension using an ionization chamber.

The barium sulfate suspensions can also be prepared with standardized gastric secretions instead of plain water. Comparison of various barium sulfate suspensions, both those of this invention and those of the prior art, each suspension initially containing an equal weight of barium per 100 cc. of suspension, clearly demonstrates the fact that barium sulfate suspensions prepared according to this invention take far longer to agglutinate or settle out than do suspensions prepared according to the prior art. More particularly, 20% barium sulfate suspensions of this invention settle very slowly and 40% suspensions settle hardly at all even after 30 days.

Barium sulfate suspensions prepared according to this invention are also superior to those of the prior art in their ability to form an even smooth adherent film on glass or other surfaces and in the rapidity with which foam, produced in foaming the suspension initially, disappears. In addition, despite the fact that the novel barium sulfate suspensions of this invention settle less readily than those of the prior art, they are easily dispersible.

The invention claimed is:

1. A powder suitable for admixture with aqueous media to form a radio-opaque suspension useful in X-ray examination of the esophagus and intestinal tract comprising a major amount by weight of barium sulfate and minor amounts by weight of magnesium montmorillonite, magnesium trisilicate, sodium carboxymethyl cellulose having a viscosity in the range 20–50 centipoises at 25° C. and an antifoam agent.

2. An aqueous dispersion containing in suspension barium sulfate and minor amounts by weight, compared to the amount of barium sulfate, of magnesium trisilicate, magnesium montmorillonite, sodium carboxymethyl cellulose having a viscosity in the range 20–50 centiposes it 25° C. and an antifoam agent.

3. A power suitable for admixture with aqueous media to form a radio-opaque suspension useful in X-ray examination of the esophagus and intestinal tract containing by weight 90–96% of barium sulfate, 1–2% of magnesium montmorillonite, 0.2–1% magnesium trisilicate, 3.3–7.0% of low viscosity carboxymethyl cellulose having a viscosity in the range 20–50 centipoises at 25° C. and .05–.18% of an antifoam agent.

4. An aqueous suspension containing from one to fixe parts of water to one part of a powder containing by weight 90–96% of barium sulfate, 1–2% of magnesium montmorillonite, 0.2–1% of magnesium trisilicate, 3.3–7% of a low viscosity carboxymethyl cellulose having a viscosity in the range 20–50 centipoises at 25° C. and 0.5–.18% of an antifoam agent.

5. A powder suitable for admixture with aqueous media to form a radio-opaque media suspension useful in X-ray examination of the esophagus and intestinal tract containing by weight 93% barium sulfate, 1.6% magnesium montmorillonite, .39% magnesium trisilicate, 0.123% of methyl polysilicon, 4.758% of low viscosity carboxymethyl cellulose having a viscosity in the range 20–50 centipoises at 25° C. and .0128% of preservatives and flavoring agents.

6. An aqueous suspension containing one to five parts of water to one part of a powder containing by weight 93% of barium sulfate, 1.6% of magnesium montmorillonite, .39% magnesium trisilicate, 0.123% of methyl polysilicon, 4.758% of low viscosity carboxymethyl cellulose and .0128% of preservatives and flavoring agents.

References Cited by the Examiner

UNITED STATES PATENTS 1,861,696  6/32  Hearth _____ 167—95

FOREIGN PATENTS 708,096  4/54  Great Britain.

OTHER REFERENCES

Hodges, JAMA, vol. 153, No. 16, Dec. 19, 1953, pp. 1417–1421; JAMA, vol. 155 (9); p. 859, June 26, 1954.

Merck Index, Merck and Co., Rahway, N. J. (1960), pp. 629 and 690.

Osol et al., U.S. Dispensatory, 25th ed., J. B. Lippincott Co. Philadelphia, Pa. (1955), pp. 1378–1379.

JULIAN S. LEVITT, *Primary Examiner.*

LEWIS GOTTS, *Examiner.*